J. BURNS.
MACHINE FOR DISINTEGRATING SUBSTANCES.
APPLICATION FILED JUNE 20, 1916.

1,237,241. Patented Aug. 14, 1917.
2 SHEETS—SHEET 1.

Witnesses:
Inventor:
John Burns,
By his Attorney

J. BURNS.
MACHINE FOR DISINTEGRATING SUBSTANCES.
APPLICATION FILED JUNE 20, 1916.

1,237,241.

Patented Aug. 14, 1917.
2 SHEETS—SHEET 2.

UNITED STATES PATENT OFFICE.

JOHN BURNS, OF COVENTRY, ENGLAND.

MACHINE FOR DISINTEGRATING SUBSTANCES.

1,237,241. Specification of Letters Patent. Patented Aug. 14, 1917.

Application filed June 20, 1916. Serial No. 104,760.

*To all whom it may concern:*

Be it known that I, JOHN BURNS, a subject of the King of Great Britain, residing at Coventry, in the county of Warwick, England, have invented a new or Improved Machine for Disintegrating Substances, of which the following is a specification.

This invention has for its object to provide a simple machine for enabling potatoes and other soft vegetables and the like to be mashed or pulped, while by a simple modification the same machine can, if necessary, be made suitable for cutting and slicing meat and the like. The use of the machine is not restricted to the cutting of meat or vegetables as it may be used for disintegrating other material, as for example rubber, or chaff.

According to this invention the material is fed from a hopper through a cylinder by means of a worm or other suitable conveyer, and attached to the end of the worm is a mashing grid or other suitable tool. Vegetables or the like placed in the hopper will be screwed along the cylinder and forced through the grid.

If desired, for the grid may be substituted a knife and in such case it will be fitted to a spindle which passes freely through the worm. The worm and the spindle can be caused to rotate in opposite directions when the knife is to be employed, or in the same direction when the mashing grid or the like is to be used. Thus for slicing meat the conveyer worm works in one direction and the slicing knife revolves in the opposite direction, slicing the meat as it is pushed out of the cylinder by the worm. Consequently there is a single operating handle or the equivalent which can be caused to drive both the worm and the tool in the same direction or in opposite directions. For this purpose there is employed a simple form of reversing gear.

The accompanying drawings illustrate how the invention may be carried into effect, in this:—

Like letters indicate like parts throughout the drawings.

In this construction there is the usual cylinder or barrel A which may be formed integral with the frame $A^2$ of the machine and this carries a hopper $A^3$ into which the material is supplied. Inside the cylinder is a worm B or other suitable form of spiral conveyer and it will be understood that the material supplied to the hopper is pushed along the cylinder by the worm as it rotates.

In the simplest machine there is fixed to the end of the worm a mashing grid Z. This may consist of a plate with a number of suitably shaped holes $Z^2$ attached to a spider frame which is secured to the end of the worm in any suitable manner. It will be clear that potatoes or other soft vegetables placed in the hopper, will, when the worm is rotated, be forced through the holes $Z^2$ in a mashed or pulped condition.

Preferably however, the machine is constructed so that it can also be used for slicing meat and the like, in which case a more elaborate construction is employed.

Figure 1:
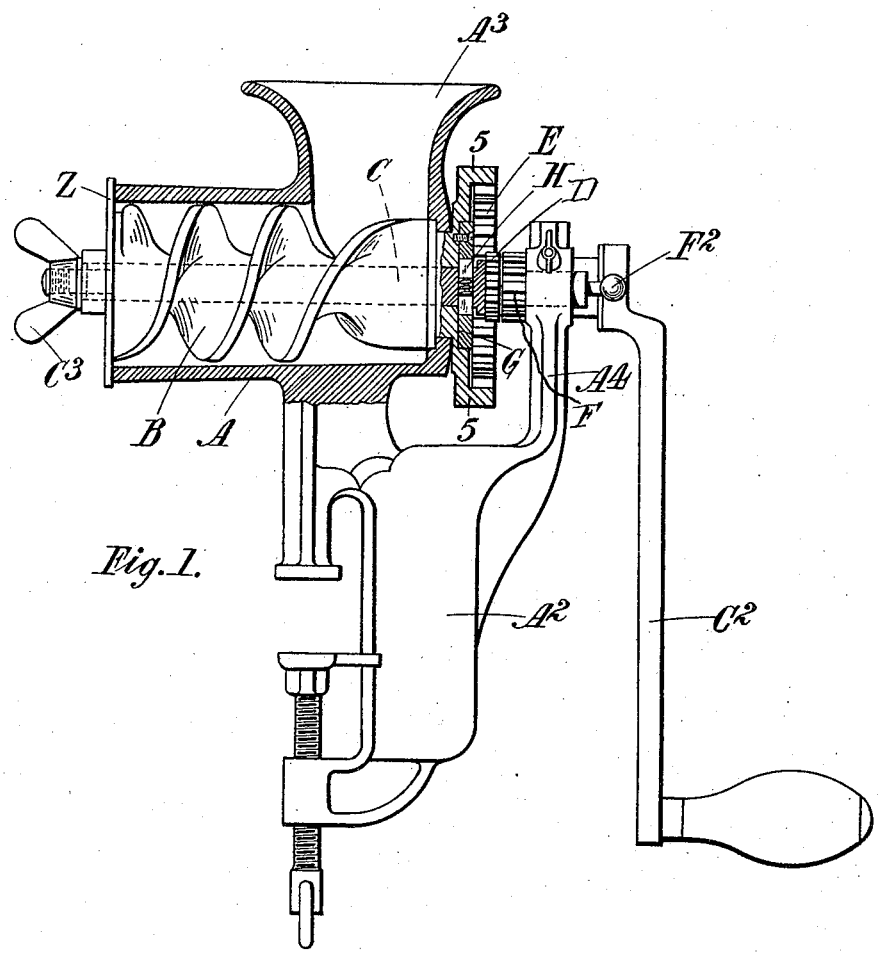
Figure 1 is a part vertical section and side elevation.
Figure 3:
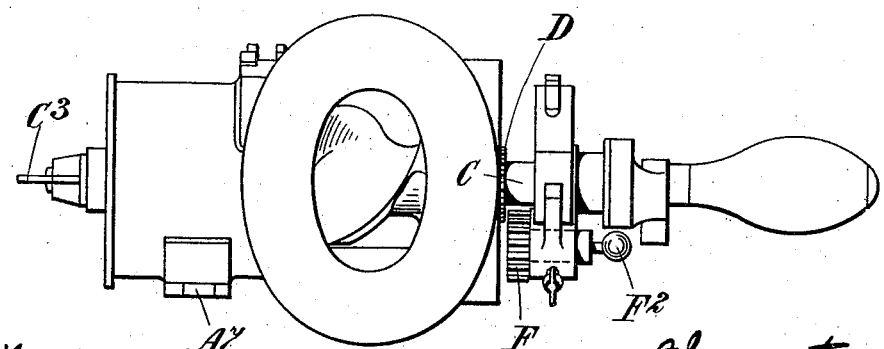
Fig. 3 is a plan.

Passing freely through the worm is a spindle C carrying at one end an operating handle $C^2$ or any other similar device, while at the other end there is adapted to be secured by the wing nut $C^3$ any one of a variety of tools, which are easily interchangeable. The spindle carries a pinion D which drives an internally toothed ring E through an intermediate pinion F and the internally toothed ring E is connected with the worm C so that the gearing, when employed, causes the spindle and worm to revolve in opposite directions. The pinion and its spindle can slide endwise and by withdrawing the intermediate pinion out of gear, as shown in Fig. 3 and locking the internally toothed ring E to the spindle C both the worm and the spindle revolve in the same direction. For locking the two together there may be any simple form of overrunning clutch which locks when the intermediate pinion is removed and overruns when the latter is in its operative position.

Figure 5:
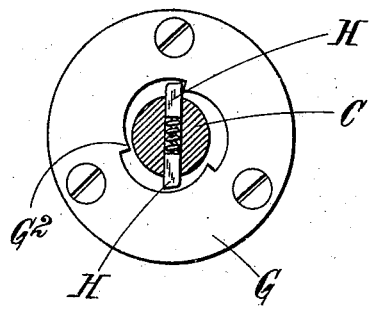
Fig. 5 is a part sectional view on a large scale on the line 5—5 of Fig. 1.
Figure 2:
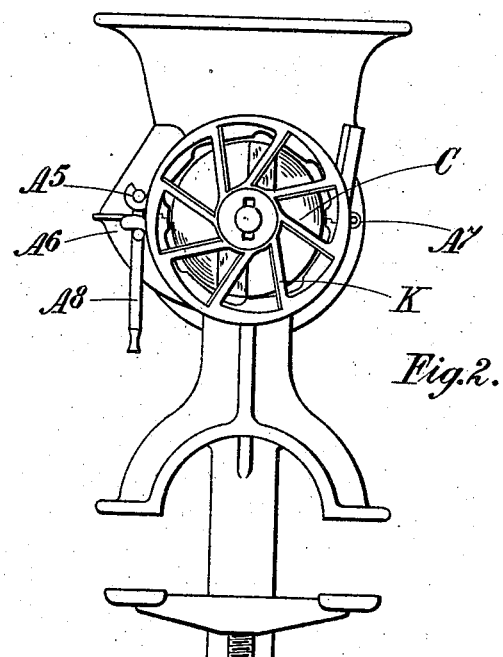
Fig. 2 is a rear view.
Figure 6:
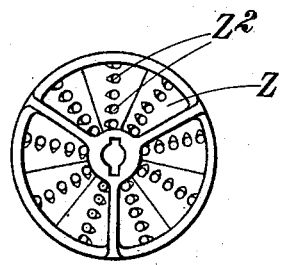
Fig. 6 is a face view of one form of mashing grid.
Figure 4:
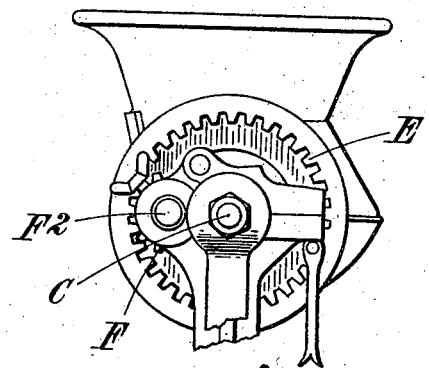
Fig. 4 is a partial front view.

Thus there may be attached to the internally toothed ring E a plate G, see Fig. 5, provided with internal ratchet teeth G² which are engaged by pawls H carried by the spindle. Consequently the spindle and the worm revolve in the same direction when the handle is turned in one direction, but they can also be rotated in opposite directions. For this rotation the pinion F is pushed into mesh by pressing the knob F² which projects from its spindle. Then if the handle C² is revolved backward the worm will rotate forward and in its original direction.

For slicing meat, the intermediate pinion is engaged, and a cutting tool K consisting of one, two, or more radial knives fitted on the spindle C. On turning the handle the meat supplied to the hopper will be forced along the cylinder and as it issues from the outlet end it will be turning in the opposite direction to the knives K which will slice it up rapidly. In a similar manner chaff, turnips, or other material may be cut.

For mashing or slicing potatoes or other vegetables the knives K are removed and a mashing grid of some known type is fitted on the spindle, or a potato slicer, and the intermediate pinion is removed. Rotation of the handle causes the vegetables to be forced along the cylinder and pushed through the grid or slicing tool. The vegetables therefore issue in a pulp or in slices as is required. If desired potatoes boiled in their skins can be passed through the machine and through a mashing grid, issuing in a mashed state ready for eating.

In a similar manner grating can be effected.

The sliding pinion F may be carried in a suitable bearing on a bracket A⁴ forming part of the frame. Preferably the hopper consists of two parts A⁵ and A⁶ hinged together at A⁷ and secured by a wing nut or a catch A⁸. Thus the conveyer can be easily removed and the interior of the hopper quickly cleaned.

By this means it is possible to provide a simple machine which can be used either for cutting up meat or for treating vegetables.

Obviously the form of reversing gear employed may be varied as is found desirable.

What I claim as my invention and desire to secure by Letters Patent is:—

1. In combination, a cylinder, a spiral conveyer in said cylinder, a spindle, a tool carried by said spindle, a single operating handle carried by the spindle, means intermediate said conveyer and the spindle whereby said spindle and conveyer may be caused to rotate in the same direction or in opposite directions when said operating handle is turned, and means for supplying material to the cylinder.

2. In combination, a cylinder having a hopper for supplying material thereto, a hollow spiral conveyer in said cylinder, a spindle passing through said conveyer and projecting at both ends beyond the latter, a tool fitted to one of the projecting ends of said spindle, a single operating handle fitted to the other projecting end of the spindle, and means intermediate the conveyer and the spindle whereby said spindle and conveyer may be caused to rotate in the same direction or in opposite directions when said operating handle is turned.

3. In combination, a supporting frame, a cylinder carried thereby, a hollow spiral conveyer rotatably arranged in the cylinder, a rotatable spindle passing through the conveyer, a tool fitted to one end of the spindle, a single operating handle fitted to the other end of the spindle, gearing, the elements of which latter are carried by the frame, the spindle and the conveyer, said gearing being arranged to cause the spindle and conveyer to rotate in the same direction or in opposite directions when said operating handle is turned, and means for supplying material to the cylinder.

In testimony whereof I have signed my name to this specification in the presence of two subscribing witnesses.

JOHN BURNS.

Witnesses:
  CHARLES WILSON,
  ALFRED SOUTHWOOD.

Copies of this patent may be obtained for five cents each, by addressing the "Commissioner of Patents,
Washington, D. C."